United States Patent [19]

Rericha et al.

[11] Patent Number: 4,789,166
[45] Date of Patent: Dec. 6, 1988

[54] ROTARY SHAFT WAVE SEAL

[75] Inventors: Brian F. Rericha, Downers Grove; Bernard G. Stritzke, Hanover Park, both of Ill.

[73] Assignee: Microdot Inc., Darien, Conn.

[21] Appl. No.: 95,955

[22] Filed: Sep. 14, 1987

[51] Int. Cl.$^4$ .......................... F16J 15/32; B23P 11/00
[52] U.S. Cl. ...................................... 277/134; 29/458; 277/153
[58] Field of Search .......................... 277/153, 134, 58; 425/127, DIG. 47; 29/458, 527.1

[56] References Cited

U.S. PATENT DOCUMENTS

| 2,672,359 | 3/1954 | Fisher et al. | 277/153 |
| 2,736,583 | 2/1956 | Marvin | 277/153 |
| 2,736,584 | 2/1956 | Riesing | 277/153 |
| 3,941,396 | 3/1976 | Bailey et al. | 277/134 |
| 3,962,776 | 6/1976 | Mikami | 277/134 X |
| 4,531,747 | 7/1985 | Miura | 277/134 |

FOREIGN PATENT DOCUMENTS 3405513  4/1985  Fed. Rep. of Germany ........ 277/58

Primary Examiner—Donald A. Griffin
Attorney, Agent, or Firm—Lyman R. Lyon

[57] ABSTRACT

A seal for use about a rotatable shaft comprises an annular cylindrical elastic sealing element having a radially inwardly extending flange defining a sealing lip at its radially innermost edge. An axially undulatory wave spring molded internally of the flange induces axial undulations in the sealing lip thereon while acting as a garter spring to maintain the lip in contiguity with a shaft passing therethrough. Upon rotation of the shaft, the undulating sealing lip deflects the fluid to be contained therewith away from the seal, thereby increasing seal effectiveness.

8 Claims, 2 Drawing Sheets

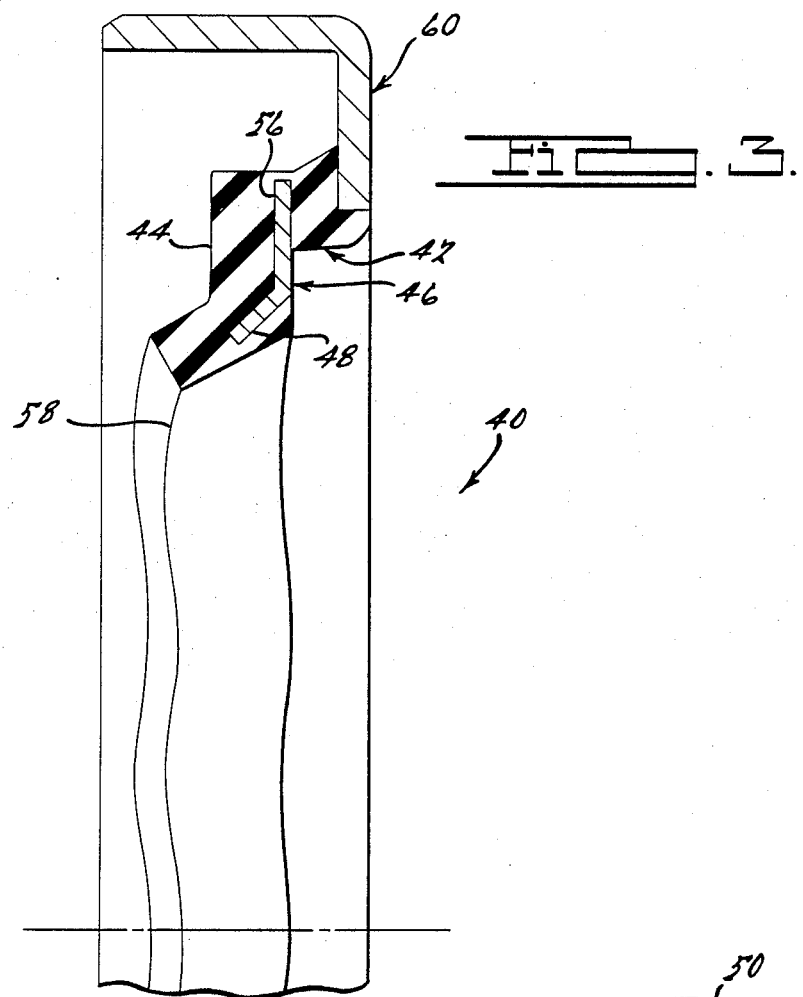
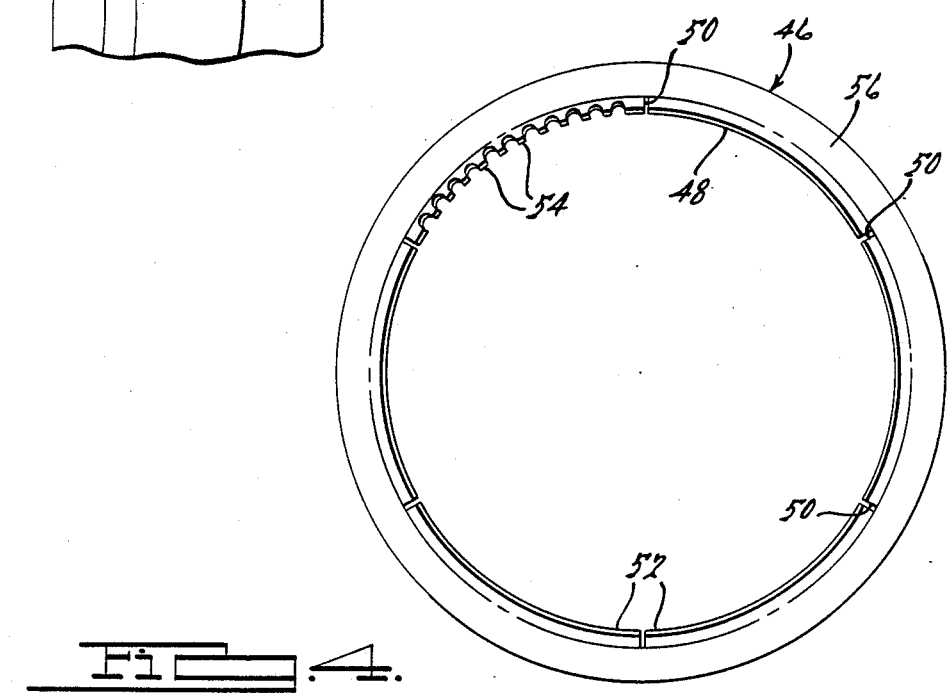

ROTARY SHAFT WAVE SEAL

BACKGROUND OF THE INVENTION

The instant invention relates to rotary shaft seals which employ an axially undulating sealing lip.

It is well known to form the sealing lip on a rotary shaft seal into the shape of a wave, whereby the fluid to be contained by the seal is directed away therefrom by the sealing lip upon rotation of the shaft. Such known shaft seals typically employ a garter spring to radially contract the sealing lip about the surface of the shaft in order to maintain contact therebetween and, thus, provide an effective seal. Unfortunately, expensive custom molds are required for the production of such seals, and an additional assembly operation is necessary to install the garter spring. Moreover, the garter spring of such seals tends to work free from its locating groove thereon or fail due to environmental effects, thereby rendering the seal ineffective.

SUMMARY OF THE INVENTION

The rotary shaft seal of the instant invention comprises an annular, substantially cylindrical elastic sealing element having an internal sealing lip defined by the radially innermost edge of a radially inwardly extending flange which encompasses an axially undulatory annular spring. The elastic material of the sealing element is molded about the spring while the spring is axially compressed and, hence, radially expanded, by the mold sections. Subsequent to the curing of the elastic material, the mold sections are separated, and the spring radially contracts as it attempts to return to its originally corrugated configuration. The spring thus induces axial undulations in the sealing lip while serving thereafter as a garter spring to maintain sealing lip contact with a shaft passing therethrough. Moreover, as the undulation and radial contraction of the sealing lip are generated by the spring subsequent to release from the mold, the mold cavity required for formation of the lip is greatly simplified, merely requiring a planar tapered inner edge on the internal flange which encompasses the spring.

The spring is substantially shielded from environmental effects, as it is encompassed by the elastic material of the sealing element. The symmetrical distortion of the sealing lip by the spring allows the seal to function as a bidirectional pump, i.e., fluid will be deflected therefrom irrespective of the rotational direction of the shaft. A second internal sealing lip for excluding contaminants from the undulating sealing lip is readily molded into the elastic sealing element on the "dry" side of the seal.

In an alternate embodiment of the instant invention, a radially inward portion of the wave spring is segmented and axially inclined to form a plurality of finger springs thereon. The finger springs provide additional radial support for maintaining the undulating sealing lip in contact with the rotary shaft extending therethrough.

BRIEF DESCRIPTION OF THE DRAWINGS

FIG. 3 is a fragmentary view in cross-section of an alternate embodiment of the rotary shaft seal of the instant invention; and FIG. 4 is a top view of the wave spring utilized in the alternate embodiment shown in FIG. 3.

DETAILED DESCRIPTION OF THE PREFERRED EMBODIMENT OF THE INVENTION

Figure 1:
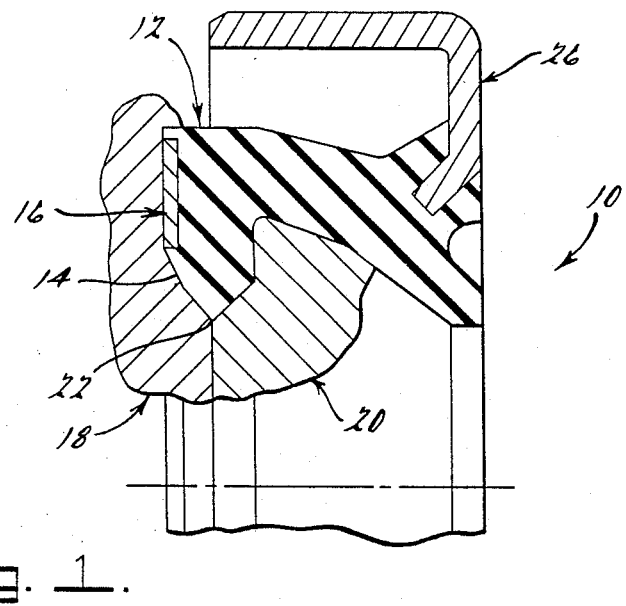
FIG. 1 is a fragmentary view in cross-section of a rotary shaft seal constructed in accordance with the instant invention during molding thereof.
Figure 2:
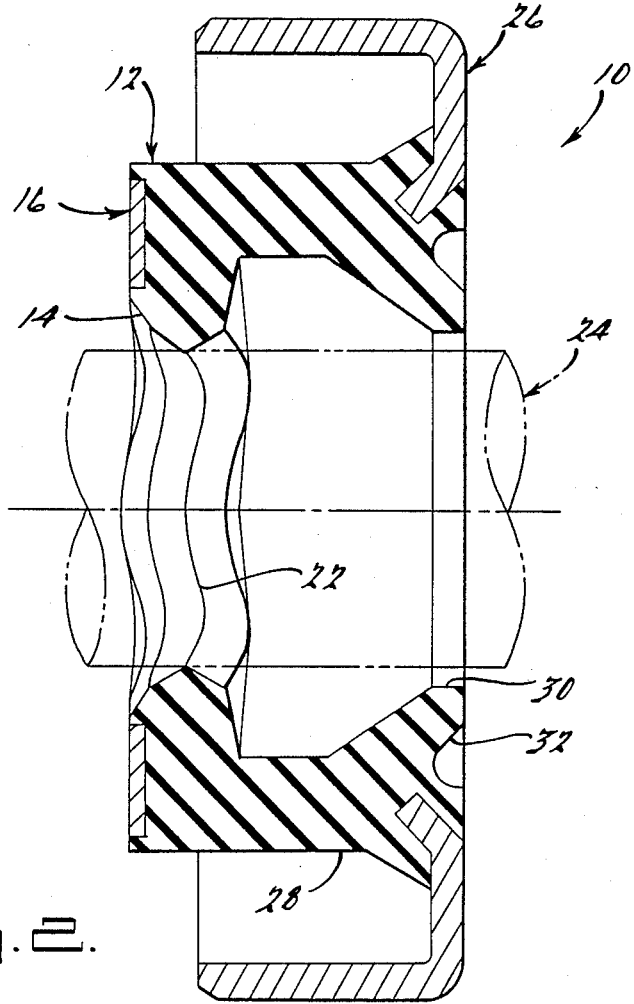
FIG. 2 is a view in cross-section of the rotary shaft seal of FIG. 1 subsequent to its release from the mold.

Referring to FIGS. 1 and 2, an exemplary embodiment of the rotary shaft seal 10 of the instant invention comprises an annular cylindrical sealing element 12 formed of rubber or other elastic material and having a radially inwardly extending flange 14 wherein an annular, axially undulating spring 16 (hereinafter "wave spring") is encapsulated. The flange 14 of the sealing element 12 is molded about the wave spring 16 while the wave spring 16 is axially compressed by a pair of mold sections 18 and 20. It is significant that axial compression of the wave spring 16 by the mold sections 18 and 20 produces elastic radial expansion thereof. Thus, the number of axial undulations in the wave spring 16 directly influences the amount of elastic radial expansion obtainable therefrom. The flange 14 is formed with a tapered radially innermost edge that is coplanar with the axial centerplane of the compressed wave spring 16, thereby providing a sealing lip 22 thereon. As the cured sealing element 12 is released from the mold, the wave spring 16 located therein attempts to return to its original shape. The wave spring 16 thus elastically distorts the flange 14 of the sealing element 12 by inducing axial undulations therein, whereby the sealing lip 22 is axially undulated, as illustrated in FIG. 2. Moreover, as the wave spring 16 returns to its original configuration, it contracts radially inwardly and, hence, functions thereafter as a garter spring to maintain contact between the undulating sealing lip 22 and the surface of a rotary shaft 24 passing therethrough.

The sealing element 12 is supported as by a cup-shaped retaining element 26 formed of rigid material, such as metal, that is molded thereto. The body portion 28 of the sealing element 12 accurately locates the undulating sealing lip 22 concentrically with the rotary shaft 24, thereby accommodating any eccentricity or offset in location of the sealing element 12 within the retaining element 26, or of the retaining element 26 with respect to the housing seal bore (not shown), which might otherwise displace the undulating sealing lip 22 from the shaft 24. It is to be noted that, although the body portion 28 of the sealing element 12 is shown in FIG. 2 as comprising a right circular cylinder, the instant invention contemplates the use of any configuration suitable for allowing radial contraction of the internal flange 14 subsequent to release of the seal element 12 from the mold sections 18 and 20, such as that of a conical frustum.

As shown in FIG. 2, a secondary sealing lip 30 integral with the sealing element 12 is provided on the "dry" side of the seal 10 for excluding dust and dirt from the primary, undulatory sealing lip 22. The secondary sealing lip 30 comprises the radially innermost end of a second internal flange 32 formed on the body portion 28 of the sealing element 12 and extending axially away from the primary, undulatory sealing lip 22. The secondary sealing lip 30 extends radially inwardly sufficiently to make light sealing contact with the shaft 24 passing therethrough, but preferably not as far as the innermost end of the primary, undulatory sealing lip 22.

Referring to FIG. 3, an alternate embodiment of the rotary shaft seal 40 of the instant invention comprises an annular cylindrical elastic sealing element 42 having a radially inwardly extending flange 44 wherein a wave spring 46 is encapsulated. The radially inward portion 48 of the wave spring 42 is provided with a plurality of radially outwardly extending, circumferentially-spaced slots 50, defining thereby a like number of arcuate segments 52, as illustrated in FIG. 4. Each of the segments 52 is inclined axially and notched to generate a plurality of cantilevered segments or "fingers" 54 extending axially and radially inwardly from the axially undulating surface 56 of the wave spring 46.

In the manner heretofore disclosed, the flange 44 of the sealing element 42 is molded about the wave spring 46 while the wave spring 46 is axially compressed, producing, upon release from the mold sections, elastic distortion of the sealing lip 58 thereof as the wave spring 46 attempts to return to its original shape. Axial undulations are thus induced in the sealing lip 58, as illustrated in FIG. 3.

Additionally, the wave spring 46 radially contracts upon its release from the mold, thereafter functioning as a garter spring to maintain contact between the undulating sealing lip 58 and the surface of a rotary shaft (not shown) passing therethrough. It is to be noted that the fingers 54 on the wave spring 58 operate as finger springs to assist the spring's radial contraction of the wave spring 46 in maintaining the sealing lip 58 thereon in contiguity with the rotary shaft passing therethrough.

The sealing element 42 is supported within the housing seal bore (not shown) as by a cup-shaped retaining element 60 that is molded thereto, as described hereinabove with respect to the first embodiment 10 of the instant invention. A secondary sealing lip may be added if so desired.

While the preferred embodiment of the invention has been disclosed, it should be appreciated that the invention is susceptible of modification without departing from the spirit of the invention or the scope of the subjoined claims.

We claim:

1. A method for manufacturing a rotary shaft seal comprising the steps of
    inserting an annular axially undulating spring element between a pair of relatively movable mold sections;
    axially compressing said spring element between said mold sections;
    molding an elastic material about and concentric with said axially compressed, radially expanded spring element;
    curing said elastic material while said spring element is maintained in axial compression by said mold; and
    releasing said cured elastic material from said mold, whereby said spring element axially expands and radially contracts so as to distort a portion of said cured elastic material into an axially undulated and radially contracted configuration.

2. The method of claim 1 including the step of forming a radially inwardly extending flange having a tapered innermost edge coplanar with the axial centerplane of, and concentric with, said axially compressed spring element, said edge forming a radially contracted undulating sealing lip upon release of said cured elastic material from said mold.

3. The method of claim 1 including the steps of
    inserting a cup-shaped element in said mold, said cup-shaped element having a generally cylindrical wall section and a transverse end wall, the end wall of said cup-shaped element having a central longitudinal aperture for receiving said shaft therethrough; and
    molding said elastic material to the end wall of said cup-shaped element so as to position said cup-shaped element coaxial with, and axially removed from, said spring element.

4. A rotary shaft seal comprising
    an annular spring element having undulating axially facing parallel edge portions facilitating radial expansion of said spring element upon axial compression thereof;
    an annular, substantially cylindrical elastic sealing element having a radially inwardly extending flange defining a sealing lip on the radially innermost portion thereof, said spring element being disposed internally of the flange, whereby said spring element induces axial undulations in the sealing lip while inducing radial contraction thereof; and
    means for rigidly supporting said sealing element relative to a rotatable shaft.

5. The seal of claim 4 wherein said sealing element is supported by a cup-shaped element having a generally cylindrical wall section and a transverse end wall, the end wall of said cup-shaped element having a central longitudinal aperture for receiving said shaft therethrough, an end of said sealing element being molded to the end wall of said cup-shaped element so as to place said sealing element concentric with said cup-shaped element.

6. The seal of claim 5 including a secondary sealing lip formed of elastic material and supported by said cup-shaped element so as to extend radially inwardly and axially oppositely from the undulating sealing lip.

7. The seal of claim 6 wherein the secondary sealing lip comprises a portion of said substantially cylindrical elastic sealing element axially removed from the radially inwardly extending flange thereon.

8. The seal of claim 4 wherein a radially inward portion of said annular spring element has a plurality of radially outwardly extending, circumferentially-spaced slots formed therein to define a like number of segments, the segments being axially inclined, whereby a plurality of finger springs are formed on the radially inward portion of said spring element.

* * * * *